(12) United States Patent
Uehara et al.

(10) Patent No.: US 6,416,832 B1
(45) Date of Patent: Jul. 9, 2002

(54) PACKAGING FILM OR SHEET

(75) Inventors: Tsutomu Uehara; Hitoshi Ishii; Hajime Tsukamoto, all of Ibaraki (JP)

(73) Assignee: Kureha Kagaku Kogyo K.K., Tokyo (JP)

( * ) Notice: Subject to any disclaimer, the term of this patent is extended or adjusted under 35 U.S.C. 154(b) by 0 days.

(21) Appl. No.: 09/331,508

(22) PCT Filed: Dec. 24, 1997

(86) PCT No.: PCT/JP97/04787

§ 371 (c)(1),
(2), (4) Date: Jun. 22, 1999

(87) PCT Pub. No.: WO98/29250

PCT Pub. Date: Jul. 9, 1998

(30) Foreign Application Priority Data

Dec. 27, 1996 (JP) .............................. 8-357877

(51) Int. Cl.[7] .......................... A22C 13/00; B29D 22/00
(52) U.S. Cl. .................... 428/34.8; 428/35.2; 428/348; 428/474.4; 428/474.7; 428/474.9; 428/475.8; 428/476.3
(58) Field of Search ............................... 428/34.8, 348, 428/474.4, 474.7, 474.9, 475.8, 476.3, 35.2

(56) References Cited

U.S. PATENT DOCUMENTS 5,326,613 A * 7/1994 Stenger ...................... 428/34.8
5,612,104 A * 3/1997 Grund ......................... 428/348

FOREIGN PATENT DOCUMENTS

| DE | 3943024 | | 7/1991 |
| DE | 4339337 | | 5/1995 |
| EP | 0465931 | | 1/1992 |
| EP | 0527237 | | 2/1993 |
| EP | 0714763 | | 6/1996 |
| JP | 4-122732 | * | 4/1992 |
| WO | WO9507180 | | 3/1995 |
| WO | WO 95/07180 | * | 3/1995 |

* cited by examiner

Primary Examiner—Leszek Kiliman
(74) Attorney, Agent, or Firm—Dinsmore & Shohl LLP

(57) ABSTRACT

The invention provides a single-layer or multi-layer packaging film or sheet having at least one layer formed of a polyamide resin composition, wherein the layer formed of the polyamide resin composition is a layer (A) formed of a polyamide resin composition comprising a copolymer nylon (c) composed of an aliphatic nylon (co)polymer component (1) and an aromatic nylon (co)polymer component (2) in a proportion of at least 5 wt. %.

37 Claims, No Drawings

PACKAGING FILM OR SHEET

FIELD OF THE INVENTION

The present invention relates to a single-layer or multi-layer packaging film or sheet having a layer of a polyamide resin composition, and more particularly to packaging films or sheets which are well balanced among properties such as formability, heat shrinkability, gas barrier properties, softness and suitability for automatic packaging machines equipped with a sealing mechanism such as a high-frequency sealer.

The packaging films or sheets according to the present invention are particularly suitable for use as casing films, pillow packaging films or sheets and deep-draw packaging films or sheets for filling and packaging fluid or semifluid foods such as sausage and solid foods such as processed meat and ham.

BACKGROUND OF THE INVENTION

In recent years, remarkable technical innovation has been made in the field of food packaging, and packaging materials most suitable for packaging, preservation, shipment and the like of various foods have been always demanded. The development of an automatic packaging system has been advanced with a view toward increasing production and reducing cost, and so the packaging materials are required to have excellent suitability for automatic packaging machines.

Single-layer or multi-layer films or sheets formed of various kinds of synthetic resins are generally used in the fields of casing films, pillow packaging films or sheets and deep-draw packaging films or sheets for filling and packaging fluid or semifluid foods, for example, processed livestock products such as sausage, processed marine products such as fish meat sausage, and processed farm products and cooked products such as devil's-tongue jelly and sweet rice jelly, and solid products such as processed meat products and ham. For example, films formed of a resin composition composed of nylon and a polyolefin resin, or multi-layer laminated films composed of a nylon layer and a polyolefin resin layer are often used in the field of the casing films.

Of these films, a multi-layer laminated film composed of a nylon layer and a polyethylene layer (hereinafter referred to as "Ny/PE film") has good heat sealing property and gas barrier properties and is hence widely used. However, this Ny/PE film has involved a problem that it is lacking in softness. In addition, to the Ny/PE film, may be applied fin sealing (sealing surfaces being both the polyethylene layer) in which the polyethylene layer is used as sealing layers, but can not be applied the so-called overlap sealing (the sealing surfaces being the nylon layer and polyethylene layer). Therefore, the Ny/PE film can not be applied to any automatic filling and packaging machine equipped with an envelope-seam type sealing mechanism.

Several proposals have been made for polyamide resin compositions satisfying various properties as a casing film by a single layer. For example, in Japanese Patent Application Laid-Open No. 122732/1992, has been proposed a casing film formed from a mixture of nylon 6, and an aromatic copolyamide (hereinafter referred to as "nylon 6I/6T") composed of a polycondensate of hexamethylenediamine with terephthalic acid and isophthalic acid. However, this casing film has involved difficulty in stably conducting blow stretching when this casing film is produced by blown-film extrusion, because the internal stress of a tubular parison upon the blow stretching is high, so that the air pressure within a blown bubble becomes high, and bubble break often occurs. In addition, this casing film has also involved a problem that when the casing film is filled with sausage in accordance with a method known per se in the art, boiled and then cooled, the wrinkles occur on the surface of the product, and the dimensions of the product become unstable. Further, the casing film has high stiffness, so that working properties such as shirring and ease of filling are deteriorated.

When an aromatic nylon (hereinafter referred to as "nylon MXD6") composed of adipic acid and m-xylylene-diamine is used in place of the nylon 6I/6T in the polyamide resin compositions, the above-described tendency becomes more pronounced. A film or sheet obtained by blown-film extrusion using the nylon MXD6 involves difficulty in deep drawing it because when it is deep drawn, elongation of the film or sheet becomes uneven at portions corresponding to parts of from corners of the bottom to side walls of a deep-draw mold.

OBJECTS AND SUMMARY OF THE INVENTION

It is an object of the present invention to provide a single-layer or multi-layer packaging film or sheet having excellent formability, heat shrinkability, gas barrier properties and softness.

Another object of the present invention is to provide a single-layer or multi-layer packaging film or sheet which has excellent ease of filling, causes no wrinkle and has excellent dimensional stability when it is used as a casing film.

A further object of the present invention is to provide a single-layer or multi-layer packaging film or sheet which has such excellent properties as described above and is suitable for use as a casing film, a pillow packaging film or sheet, or a deep-draw packaging film or sheet for packaging fluid or semifluid food, or solid food.

The present inventors have carried out an extensive investigation with a view toward overcoming the above-described problems involved in the prior art. As a result, it has been found that when a polyamide resin composition comprising a specific copolymer nylon is used for a single-layer or multi-layer packaging film or sheet having a layer formed of a polyamide resin composition, the above objects can be achieved.

The packaging films or sheets according to the present invention may be used in the form of a single-layer film or sheet, but may be used in the form of a multi-layer film or sheet by laminating it on other layers such as a polyolefin resin layer, as desired. The single-layer films composed of a layer of the polyamide resin composition according to the present invention or the multi-layer films having the layer of the polyamide resin composition as a surface layer have excellent suitability for automatic packaging machines equipped with a high-frequency sealing mechanism and may also be ultrasonically sealed.

The packaging films or sheets according to the present invention can be suitably used as heat shrinkable films, in particular, casing films when they are formed into oriented films. A multi-layer film or sheet obtained by laminating a polyolefin resin layer on the layer of the polyamide resin composition can be heat sealed by using the polyolefin resin layer as a sealing surface. A single-layer or multi-layer tubular film or sheet obtained by blown-film extrusion can be used as a casing film as it is. Non-oriented packaging films or sheets according to the present invention have excellent suitability for automatic packaging machines and deep drawing property and are suitable for use as films or sheets for pillow packaging (i.e., flow-pack) and deep-draw packaging (i.e., thermo-forming).

The present invention has been led to completion on the basis of these findings.

According to the present invention, there is thus provided a single-layer or multi-layer packaging film or sheet having at least one layer formed of a polyamide resin composition, wherein the layer formed of the polyamide resin composition is a layer (A) formed of a polyamide resin composition comprising a copolymer nylon (c) composed of an aliphatic nylon (co)polymer component (1) and an aromatic nylon (co)polymer component (2) in a proportion of at least 5 wt.%.

DETAILED DESCRIPTION OF THE PREFERRED EMBODIMENTS

Copolymer nylon (c):

In the present invention, as a polyamide resin composition for forming the polyamide resin composition layer (A), is used a polyamide resin composition comprising a copolymer nylon (c) composed of an aliphatic nylon (co)polymer component (1) and an aromatic nylon (co)polymer component (2) in a proportion of at least 5 wt. %.

Examples of the aliphatic nylon (co)polymer component (1) include nylon 6, nylon 11, nylon 12, nylon 66, nylon 69, nylon 610, nylon 6/66 and nylon 6/12. Of these, at least one aliphatic nylon (co)polymer component selected from the group consisting of the components of nylon 6, nylon 66 and nylon 610 is preferred. Particularly, nylon 6/12, nylon 66/69, nylon 66/610 and nylon 610 are more preferred.

As the aromatic nylon (co)polymer component (2), is preferably used that having an aromatic diamine unit or that having an aromatic dicarboxylic acid unit. Specific examples thereof include xylylene type polyamides. The xylylene type polyamides are polyamide resins synthesized by a polycondensation reaction of m-xylylenediamine alone or a diamine mixture of m-xylylenediamine in an amount of at least 60 wt. %, preferably at least 70 wt. % and p-xylylenediamine in an amount of at most 40 wt. %, preferably at most 30 wt. % with an aliphatic dibasic acid having 6–12 of carbon atoms, for example, adipic acid, sebacic acid, suberic acid, undecanedioic acid or dodecanedioic acid. More specific examples thereof include homopolymers such as poly(m-xylylene adipamide), poly (m-xylylene sebacamide) and poly(m-xylylene suberamide), m-xylylene/p-xylylene adipamide copolymers, m-xylylene/p-xylylene pimelamide copolymers, m-xylylene/p-xylylene azelamide Copolymers. and m-xylylene/p-xylylene adipamide/sebacamide copolymers. Of these, poly(m-xylylene adipamide) (MXD6) is preferred.

Other examples of the aromatic nylon (co)polymer component (2) include polycondensates of hexamethylenediamine with at least one aromatic dicarboxylic acid selected from the group consisting of terephthalic acid and isophthalic acid.

A proportion of the aromatic nylon (co)polymer component (2) to be copolymerized in the copolymer nylon (c) is preferably at most 40 wt. % from the viewpoints of formability, heat shrinkability, gas barrier properties and softness.

Preferable examples of the copolymer nylon (c) include copolymer nylons comprising ① 45–92 wt. % of a nylon 6 component and ② 4–25 wt. % of another aliphatic nylon component than the nylon 6 component as the aliphatic nylon (co)polymer component, and ③ 4–40 wt. % of an aromatic nylon component containing a xylylenediamine unit as the aromatic nylon (co)polymer component. A specific example thereof includes nylon 6/12/MXD6.

Other preferable examples of the copolymer nylon (c) include copolymer nylons comprising ① 60–96 wt. % of a nylon 610 component or a nylon 66/610 component as the aliphatic nylon (co)polymer component and ② 4–40 wt. % of an aromatic nylon component containing a xylylenediamine unit as the aromatic nylon (co)polymer component. Specific examples thereof include nylon 610/MXD6 and nylon 66/610/MXD6.

Further examples of the copolymer nylon (c) include copolymer nylons comprising ① 60–96 wt. % of a nylon 6 component or a nylon 66/69 component as the aliphatic nylon (co)polymer component and ② 4–40 wt. % of a polycondensate component of hexamethylenediamine with at least one aromatic dicarboxylic acid selected from the group consisting of isophthalic acid and terephthalic acid as the aromatic nylon (co)polymer component. Specific examples thereof include nylon 6/6I and nylon 66/69/6I.

The copolymer nylon (c) used in the present invention is a crystalline polyamide and generally has a crystallization velocity, $\tau_{1/2}$ of 20 seconds or longer. When the so-called hot stretching, in which a polyamide resin composition is heated to 70–95° C. to stretch it, is conducted, the incorporation of the copolymer nylon (c) into the polyamide resin composition permits slowing the crystallization velocity of the polyamide resin composition to facilitate the operation of the hot stretching. Namely, the copolymer nylon (c) contributes to the improvement of stretchability, film-forming property and high-frequency sealing property. This copolymer nylon also permits improvement in the softness of a film or sheet formed, thereby improving its ease of filling with sausage or the like and further its secondary processing characteristics or properties such as suitability for shirring, ring-forming property, ease of film cutting, suitability for pillow packaging machines and deep-drawing property. The copolymer nylon improves the gas barrier properties of the film or sheet to some extent. Any blend of an aliphatic nylon such as nylon 6 and an aromatic nylon, not the copolymer nylon, cannot well balance these features with one another.

A proportion of the aromatic nylon (co)polymer component (2) such as nylon MXD6 to be copolymerized in the copolymer nylon (c) is at most 40 wt. %, preferably 4–40 wt. %. If the proportion is too low, the oxygen gas barrier property of the resulting film or sheet is lowered. If the proportion is too high on the other hand, the stiffness of the film or sheet becomes too high, and so its softness is impaired. If a proportion of the aliphatic nylon (co)polymer component (1) to be copolymerized in the copolymer nylon (c) is too low, the softness of the resulting film or sheet is impaired. If the proportion is too high on the other hand, the effects of improving the oxygen transmission rate and water vapor transmission rate of the film or sheet are lessened.

In the copolymer nylon (c) having a copolymerization composition of aliphatic nylon/another aliphatic nylon/ aromatic nylon copolymer such as the nylon 6/12/MXD6 and the nylon 66/610/MXD6, the presence of another aliphatic nylon component permits improvement in the softness of the resulting film or sheet. When the ordinary nylon MXD6 is used in place of the specific copolymer nylon, the resulting film becomes poor in softness and stretchability, is too hard to achieve good suitability for shirring as a casing film for packaging a pasty substance such as sausage, and is also not very improved in dimensional stability.

A proportion of the copolymer nylon (c) to be incorporated into the polyamide resin composition is at least 5 wt. %, preferably 5–40 wt. %, more preferably 5–30 wt. %. If the proportion is too low, the effect of slowing the crystallization velocity of the polyamide resin composition is lessened. If the proportion is too high on the other hand, the resulting film becomes too soft, so that when a casing film composed of such a film is filled with sausage or the like, the film is elongated by the filling pressure, and so the dimensions and form of the resulting product vary, and the dimensional stability and form stability of the product are impaired. Even if the proportion of the copolymer nylon (c) exceeds 40 wt. %, such various properties are easy to be well balanced when a layer of such a composition is laminated on a layer of another polyamide resin than this, for example, an aliphatic (copolymer nylon or nylon MXD6.

Polvamide resin composition:

According to the present invention, in a single-layer or multi-layer packaging film or sheet having at least one layer formed of a polyamide resin composition, a polyamide resin composition comprising the copolymer nylon (c) in a proportion of at least 5 wt. % is used as the polyamide resin composition for forming the layer of the polyamide resin composition. The polyamide resin composition comprises at least 5 wt. % of the copolymer nylon (c) and at most 95 wt. % of another nylon (co)polymer than the copolymer nylon (c), and as needed, any other resin component such as an amorphous nylon (b) and/or a polyolefin resin may be blended therewith within the limits of a minor amount.

As the polyamide resin composition, is preferred a polyamide resin composition comprising 40–70 wt. % of nylon 6 (a), 5–20 wt. % of an amorphous nylon (b), 5–30 wt. % of the copolymer nylon (c) and 10–30 wt. % of a polyolefin resin (d).

Besides, a polyamide resin composition comprising 50–95 wt. % of nylon 6 (a) and 5–50 wt. % of the copolymer nylon (c) may be used as the polyamide resin composition. Further, a polyamide resin composition comprising 50–95 wt. % of nylon MXD6 (e) and 5–50 wt. % of the copolymer nylon (c) may preferably be used as the polyamide resin composition.

Nylon 6:

Nylon 6 (Ny 6) in the polyamide resin composition is concerned in the balance between film-forming property and oxygen gas barrier property. A proportion of nylon 6 to be incorporated may be suitably determined according to other blending components. In a polyamide resin composition comprising nylon 6 (a), an amorphous nylon (b), the copolymer nylon (c) and a polyolefin resin (d), however, the proportion of the nylon 6 is generally 40–70 wt. %, preferably 50–70 wt. %.

In a polyamide resin composition comprising nylon 6 (a) and the copolymer nylon (c), the proportion of the nylon 6 is generally 50–95 wt. %, preferably 40–95 wt. %. Accordingly, the proportion of the copolymer nylon (c) is generally 5–50 wt. %, preferably 5–40 wt. %.

If the proportion of nylon 6 is too high, the oxygen transmission rate and water vapor transmission rate of the resulting oriented film are lowered. If the proportion is too low on the other hand, the stretchability upon the formation of a blown film is lowered.

Amorphous nylon:

The amorphous nylon in the polyamide resin composition is a polyamide having an aromatic ring in its main chain and/or side chain and having no crystallinity or very low crystallinity. Specific examples thereof include polycondensates of a dicarboxylic acid such as terephthalic acid or isophthalic acid with a diamine such as hexamethylenediamine or copolymers thereof. For example, polyamides (nylon 6I/6T) obtained by polycondensing a dicarboxylic acid component composed of 10–50 wt. % of terephthalic acid and 90–50 wt. % of isophthalic acid with hexamethylenediamine may be mentioned.

The stretchability and oxygen gas barrier property of the polyamide resin composition is affected by the range of the amorphous nylon in the polyamide resin compositon. A proportion of the amorphous nylon to be incorporated in the polyamide resin composition is generally 5–20 wt. %, preferably 5–15 wt. %. If the proportion of the amorphous nylon is too high, the stiffness of the resulting film becomes high, and so its softness is lowered. If a film does not have sufficient softness, difficulty is encountered on handling when the film is put to practical use as a casing film to fill it with sausage or the like, and since suitability for shirring and ring-forming property are deteriorated, or the life of a cutter for cutting the film is shortened, problems arise on secondary processing properties of the film. When it is combined with a specific copolymer composition, these properties are easy to be well balanced. If the proportion of the amorphous nylon is too low, it is difficult to satisfactorily retain the form of the resulting film.

Polyolefin resin:

Examples of the polyolefin resin used in the present invention include homopolymers of ethylene and α-olefins, such as high density polyethylene, medium density polyethylene, low density polyethylene and polypropylene; ethylene-α-olefin copolymers (for example, copolymers obtained by using a metallocene catalyst, such as AFFINITY™) such as linear low density polyethylene (LLDPE) and very low density polyethylene (VLDPE); and besides ionomer resins, polyamide-modified ionomer resins, ethylene-vinyl acetate copolymers, ethylene-ethyl acrylate copolymers, ethylene-acrylic acid copolymers, ethylene-methyl acrylate copolymers, ethylene-methyl methacrylate copolymers and ethylene-methacrylic acid copolymers. These polyolefin resins may be used either singly or in any combination thereof.

As the polyolefin resin mixed with the polyamide resin composition, ethylene copolymers such as ethylene-acrylic acid copolymers and ethylene-methacrylic acid copolymers, and polyamide-modified ionomer resins are preferred from the viewpoint of compatibility with the individual polyamide components.

The polyamide-modified ionomer resins are resins obtained by ionizing a copolymer of ethylene and an α,β-unsaturated carboxylic acid with a metal ion such as zinc, lithium, potassium, magnesium, calcium or sodium ion to prepare an ionomer, adding a polyamide to the ionomer and melting and kneading the resultant mixture at a high temperature of 200–350° C. to modify the ionomer. Examples of the polyamide used herein include nylon 6, nylon 66, nylon 6/66, nylon 6/10, nylon 6/12, nylon 11, nylon 12 and mixture of two or more of these polyamides. Of these, nylon 6 and copolymers thereof are preferred.

A proportion of the polyolefin resin to be incorporated in the polyamide resin composition is generally 10–30 wt. %. If the proportion of the polyolefin resin is too low, the water vapor transmission rate of the resulting film becomes too high, so that loss in weight of the contents in a packaged product becomes great when sausage or the like is packaged with the film to store it. If the proportion is too high, the stretchability of the resulting film is deteriorated, and moreover its oxygen transmission rate is increased, so that the contents in a product packaged with the film tend to undergo putrefaction due to oxidative deterioration.

Film or sheet:

The polyamide resin composition useful in the practice of the present invention can be prepared by mixing the individual components by a method known per se in the art. For example, raw materials such as pellets, granules, powders or the like of the individual polymers are mixed upon the formation of a film or sheet, whereby a uniform composition can be prepared. To the polyamide resin composition, may be added various additives such as a plasticizer, a stabilizer, a lubricant, an antioxidant, a pigment and a dye, as needed, within limits not impairing the properties of the resulting film.

No particular limitation is imposed on the film-forming process. For example, T-die extrusion or blown-film extrusion may be used. The blown-film extrusion is generally used. The melting temperature of each resin is generally 300° C. or lower, preferably 240–280° C., more preferably 240–260° C. A non-oriented film obtained by the T-die extrusion is biaxially oriented simultaneously or successively at an orientation temperature of 120° C. or lower by a tenter process. A tubular parison obtained by the blown-film extrusion is biaxially oriented by blowing air into the parison at an orientation temperature of 120° C. or lower to inflate it. The draw ratio is generally 2.0–10.0 times, preferably 2.2–8.0 times, more preferably 2.2–5.0 times in each of machine and transversal directions. Moderate heat shrinkability and dimensional stability such as creep characteristics are achieved by the orientation.

The thickness of the film according to the present invention is generally 10–100 $\mu$m, preferably 10–50 $\mu$m, more preferably 20–40 $\mu$m in the case of a singly-layer film. A thickness too small is not preferable because the oxygen gas barrier property and water vapor barrier property of the film are lowered. A thickness too great is also not preferable because the stiffness of the film becomes too high, and so its softness is deteriorated. In the case of a multi-layer film, the film is used in a thickness ranging from 10 to 250 $\mu$m.

In the packaging of processed meat products, packaged products such as sausage dislike wrinkling from the viewpoint of the aesthetic appearance of the products. In order to prevent the products from wrinkling, it is necessary for the film to shrink under heat upon boiling or sterilization treatment so as to keep it tense. The oriented films according to the present invention have a shrink (hot-water shrink) of generally at least 5%, preferably at least 8%, more preferably at least 10% in each of longitudinal and transversal directions when immersed in hot water of 80° C.

The films according to the present invention preferably have a haze of at most 20%. Since the haze of the films is low, the contents such as sausage can be visually seen from the outside of the packaging film.

The films or sheets according to the present invention have an oxygen transmission rate (in terms of the thickness of 35 $\mu$m) of 300 cm$^3$/m$^2$·day·atm or smaller, preferably 200 cm$^3$/m$^2$·day·atm or smaller as measured at a temperature of 30° C. and 100% RH (relative humidity) and a water vapor transmission rate of preferably 70 g/m$^2$·day or smaller as measured at a temperature of 40° C. and 90% RH, so that when a food product packaged with the film is stored for a long period of time, putrefaction of the contents by oxygen and loss in weight of water can be prevented, and the flavor and taste of the contents can be retained.

If the hot-water shrink of the casing film according to the present invention is lower than 5t at 80° C., a product obtained by filling the casing film with, for example, fluid or semifluid sausage wrinkles in its surface after boiling it. Therefore, such a low hot-water shrink is not preferable.

Hot-water creep at 80° C. for 10 seconds may be used as an evaluation standard for the dimensional stability of the films. The oriented films according to the present invention preferably have a hot-water creep of at most 20%, more preferably at most 18%. If the hot-water creep of the film is too high, a dimensional scatter of a packaged product obtained by filling with, for example, sausage becomes too wide after boiling the package. Therefore, such a too high hot-water creep is not preferable.

The films or sheets according to the present invention have excellent high-frequency sealing property. A number of films formed of a resin composition composed of a polyamide and a polyolefin resin and/or the like have heretofore been proposed and used. However, none of them are not particularly referred to the high-frequency sealing property. The present inventors have carried out an extensive investigation as to this sealing property. As a result, it has been found that when a film formed of a polyamide alone, for example, a film of nylon 6, is subjected to high-frequency sealing by an automatic filling and packaging machine (Automatic Filling and Packaging Machine KAP manufactured by Kureha Chemical Industry Co., Ltd.), discharge occurs at the sealed portion, and so good sealing property cannot be achieved. On the other hand, even when a film or sheet formed of the polyamide resin composition according to the present invention is subjected to high-frequency sealing by means of an automatic filling and packaging machine equipped with a high-frequency sealing mechanism, stable sealing can be continuously conducted without discharge. The films or sheets according to the present invention have not only excellent high-frequency sealing property but also good heat sealing property and ultrasonic sealing property.

The films or sheets according to the present invention may be used in the form of a single-layer film or sheet, but may be used in the form of a multi-layer film or sheet by laminating it on, for example, at least one polyolefin resin layer (may be combined with an adhesive resin layer) by co-extrusion or lamination in order to impart or improve heat sealing property.

More specifically, examples of the multi-layer film or sheet include multi-layer films or sheets having a laminated structure of at least 3 layers with an adhesive resin layer (B) and a polyolefin resin layer (C) laminated on a layer (A) of the polyamide resin composition in suitable combinations, for example, A/B/C, A/C/A, A/B/A, C/A/C, A/B/C/B/A and C/B/A/B/C. Additional resin layers may be provided as desired. Of these, the multi-layer film or sheet having a layer (A) of the polyamide rein compositon as a surface layer can be applied to high-frequency sealing.

Examples of the polyolefin resin include homopolymers such as low density polyethylene (LDPE), medium density polyethylene (MDPE), high density polyethylene (HDPE) and polypropylene; ethylene-α-olefin copolymers (for example, copolymers obtained by using a metallocene catalyst, such as AFFINITY™; particularly, those having a density of 0.900 g/cm$^3$ or higher) such as linear low density polyethylene (LLDPE) and very low density polyethylene (VLDPE); ethylene copolymers such as ethylene-vinyl acetate copolymers (EVA), ethylene-ethyl acrylate copolymers (EEA), ethylene-methacrylic acid copolymers (EMA), ethylene-acrylic acid copolymers (EAA) and ionomer resins; and mixtures composed of two or more of these polymers.

Examples of the adhesive resin include modified polymers obtained by graft-copolymerizing an unsaturated carboxylic acid such as maleic acid, fumaric acid or acrylic acid, or an anhydride or ester thereof with homopolymers or copolymers of olefins, such as polyethylene resins (including α-olefin resins such as LLDPE and VLDPE), polypropylene, polybutene, copolymers of these comonomers with each other, ionomer resins, ethylene-acrylic acid copolymers and ethylene-vinyl acetate copolymers; and mixtures of two or more of these graft copolymers.

Examples of other resin layers and additional resin layers include a layer formed of a saponified product (EVOH) of an ethylene-vinyl acetate copolymer, and layers formed of gas barrier resins such as nylon MXD6. These gas barrier resin layers are generally provided as an intermediate layer in the multi-layer films or sheets. In this case, in order to enhance the film-forming property and stretchability of the gas barrier resin, it is preferable that ① the gas barrier resin layer be provided in adjacency with the polyamide resin composition layer (A), ② the gas barrier resin layer be provided between two layers (A) of the polyamide resin composition, or ③ in the case of nylon MXD6, it be blended with the copolymer nylon (c) to use the blend to form a polyamide resin composition layer (A).

As other resin layers and additional resin layers, may also be mentioned layers of other polyamide resins and layers of polyethylene terephthalate resins.

As the multi-layer packaging films or sheets according to the present invention, may be mentioned multi-layer oriented films or sheets comprising at least one polyamide resin composition layer (A), and multi-layer non-oriented films or sheets comprising at least one polyamide resin composition layer (A).

Specifically, multi-layer packaging films or sheets comprising at least one polyamide resin composition layer (A) as an intermediate layer may be mentioned. More specifically, multi-layer packaging films or sheets comprising at least one polyamide resin composition layer (A) as an intermediate layer and polyolefin resin layers as the outermost layer and the innermost layer through adhesive layers may be mentioned.

Besides, multi-layer packaging films or sheets comprising at least one polyamide resin composition layer (A) as an intermediate layer, a polyethylene terephthalate resin layer as one surface layer through an adhesive layer, and a polyolefin resin layer as the other surface layer through an adhesive layer may be mentioned. In order to control the slip property of the resulting multi-layer film or sheet, silica particles may be added to the polyethylene terephthalate resin of the surface layer. As a method for adding the silica particles, there is a method in which 2.5 wt. % of silica particles are blended with 97.5 wt. % of a polyethylene terephthalate resin to prepare a lubricant, and the lubricant is added to a polyethylene terephthalate resin. If the concentration of the silica particles in the resin is 1,000 ppm or higher, the suitability of the resulting film or sheet for pillow packaging becomes poor. Therefore, it is preferable to control the concentration to generally about 200–800 ppm, more preferably about 500 ppm. A multi-layer film or sheet comprising, as a surface layer, the polyethylene terephthalate resin layer the slide property of which has been controlled as described above has far excellent suitability for pillow packaging.

Examples of the intermediate layer include ① a layer having a layer structure composed of at least one polyamide resin composition layer (A) and at least one polyamide layer laminated in adjacency with each other, and ② a layer having a layer structure composed of at least one polyamide resin composition layer (A) and at least one gas barrier resin layer laminated in adjacency with each other.

Multi-layer packaging films or sheets comprising at least one polyamide resin composition layer (A) as at least one surface layer may be mentioned. In this case, a polyolefin resin layer may be provided as an intermediate layer, or a layer of another polyamide resin (including another polyamide resin composition) may be provided as the other surface layer. More specifically, multi-layer packaging films or sheet comprising a polyamide resin composition layer (A) as one surface layer, and a polyamide resin layer as the other surface layer may be mentioned.

Multi-layer packaging films or sheets having a layer structure composed of at least two layers of a layer formed of the copolymer nylon (c) composed of the aliphatic nylon (co)polymer component (1) and the aromatic nylon (co) polymer component (2), and a layer formed of another polyamide than the copolymer nylon (c) in adjacency with each other may also exhibit good various properties. Examples of thereof include aliphatic nylon (co)polymer layer/adhesive resin layer/copolymer nylon (c) layer/ adhesive resin layer/polyethylene layer, mixed layer of aliphatic nylon (co)polymer and amorphous nylon (b)/ adhesive layer/copolymer nylon (c) layer/adhesive resin layer/mixed layer of polyethylene and anti-clouding agent.

Multi-layer packaging films or sheets having a layer structure composed of at least two layers of a layer formed of the polyamide resin composition comprising the copolymer nylon (c) composed of the aliphatic nylon (co)polymer component (1) and the aromatic nylon (co)polymer component (2) having an aromatic diamine unit, and at least one layer of a layer formed of another polyamide resin composition than the above composition and a gas barrier resin layer may also exhibit good various properties.

The single-layer or multi-layer oriented films or sheets according to the present invention can be suitably used as casing films. Since the films or sheets comprising the polyamide resin composition according to the present invention are good in film-forming property and stretchability upon the formation of the films or sheets and have moderately balanced properties among softness, hot-water shrink, creep property, toughness, gas barrier properties, dimensional stability, suitability for automatic packaging machines and the like, they are suitable for casing films for filling and packaging fluid or semifluid foods, for example, processed livestock products such as ham and sausage, processed marine products such as fish meat sausage, and processed farm products and cooked products such as devil's-tongue jelly and sweet rice jelly.

The single-layer or multi-layer non-oriented films or sheet according to the present invention are suitably used as films or sheets for deep-draw packaging and pillow packaging.

Blow molded container:

The polyamide resin composition comprising a copolymer nylon (c) composed of an aliphatic nylon (co)polymer component (1) and an aromatic nylon (co)polymer component (2) in a proportion of at least 5 wt. %, and the copolymer nylon (c) itself have excellent moldability, are easy to form a uniform section, and can be suitably used in stretch blow molding in particular.

Therefore, according to the present invention, there are provided single-layer or multi-layer blow molded containers having at least one layer formed of a polyamide resin composition, wherein the layer formed of the polyamide resin composition is a layer (A) formed of a polyamide resin composition comprising a copolymer nylon (c) composed of an aliphatic nylon (Co)polymer component (1) and an aromatic nylon (co)polymer component (2) in a proportion of at least 5 wt. %, or of the copolymer nylon (c) alone.

ADVANTAGES OF THE INVENTION

According to the present invention, there are provided single-layer or multi-layer packaging films or sheets having excellent formability, heat shrinkability, gas barrier properties, softness and suitability for automatic packaging machines equipped with a sealing mechanism such as a high-frequency sealer, heat sealer or ultrasonic sealer. The packaging films or sheets according to the present invention are suitable for use as casing films, pillow packaging films or sheets and deep-draw packaging films or sheets for filling and packaging fluid or semifluid foods such as sausage and solid foods such as processed meat and ham.

EMBODIMENTS OF THE INVENTION

The present invention will hereinafter be described more specifically by the following Examples and Comparative Examples. Incidentally, various physical properties in the examples were measured in accordance with the following respective methods.

(1) Crystalline Melting Point (Tm):

The crystalline melting point of each sample was measured by means of a DSC7 (trade name) manufactured by Perkin Elmer Company. The measurement was conducted in the following manner. Namely, 5–10 mg of a sample resin were weighed out, and the resin was melted once and held for 2 minutes at a temperature higher than the melting point at this time by 40° C. Thereafter, the resin was quenched to 0° C. at a rate of 200° C./min and held for 2 minutes. The resin was then heated at a rate of 20° C./min, and a melting peak temperature in this process was regarded as the crystalline melting point.

(2) Stretchability (Formability Upon the Formation of an Oriented Film):

A tubular parison was produced with a resin composition sample by blown-film extrusion, and air was blown into the parison to inflate and stretch it, thereby evaluating the sample as to stretchability in accordance with the following standard:

○: The parison was could be continuously stretched with extremely little breaking of the bubble;

Δ: Breaking of the bubble sometimes occurred (about once in 8 hours); and

X: Breaking of the bubble frequently occurred (at least two or three times in 8 hours). (3) Shrinkage:

A sample film was immersed for 10 seconds in hot water of 80° C., and a shrinkage of the film in each of longitudinal and transversal directions was then determined.

(4) Creep:

A sample film was immersed for 10 seconds in hot water of 80° C., and a creep of the film was then determined.

(5) Oxygen Transmission Rate:

The oxygen transmission rate of a sample film was measured by means of MOCON OXTRAN-100 MODEL (trade name) manufactured by MODERN CONTROL Co. under conditions of 30° C. and 100% RH in accordance with ASTM D 3985-81.

(6) Water Vapor Transmission Rate:

The water vapor transmission rate of a sample film was measured by means of VAPOR PERMEATION TESTER-400 (trade name) manufactured by LYSSY Co. under conditions of 40° C. and 90% RH.

(7) Overfill Rate (Maximum Fill Rate):

A sample casing film was filled with sausage, thereby determining a maximum overfill rate at this time.

(8) Ease of Filling:

Upon the determination of the overfill rate, the ease of filling of the sample casing film was evaluated in accordance with the following standard:

○: Sausage in the form of semifluid could be smoothly filled into the casing film;

Δ: The casing film was hard, and its shirring and filling thereinto were hence difficult; and X: The casing film was elongated, and the dimension in the diametric direction thereof was difficult to retain.

(9) Wrinkling Tendency:

A sample tubular oriented film was filled with sausage, and the resultant product was boiled for 60 minutes in hot water of 80° C. and immediately cooled in cold water of 5° C., thereby visually observing it and evaluating the film as to the wrinkling tendency in accordance with the following standard:

○: No wrinkle occurred; and

X: Wrinkles occurred.

EXAMPLE 1

Mixed with 56 wt. % of nylon 6 (AMILAN CM1021XF, trade name, product of Toray Industries, Inc.) were 12 wt. % of amorphous nylon (GRIVORY G21, trade name, product of EMS Chemical AG.), 12 wt. % of nylon 6/12/MXD6 (molar ratio of the comonomers: 72/8/20; Tm: 168° C.), 10 wt. % of polyethylene (SUMIKATHENE F114-1, trade name, product of Sumitomo Chemical Co., Ltd.; Tm: 106° C.) and 10 wt. % of an ethylene-acrylic acid copolymer (ESCOR TR5001, trade name, product of EXXON Chemical Co.; Tm: 102° C.; acrylic acid content: 6%), and the resultant mixture was melted and extruded at 245° C. by means of a twine-screw extruder (BT-30, trade name, manufactured by Plastic Kogaku Kenkyusho K.K.). A molten resin extruded through a ring die was immediately quenched in water of 15° C. to obtain a tubular parison.

After this parison was heated in hot water of 90° C., air was immediately blown into the parison to inflate and stretch it at draw ratios of 3.1 times and 4.1 times in longitudinal and transversal directions, respectively, by the air pressure, thereby obtaining a tubular oriented film having a thickness of 35 μm and a width of 70 mm. The formability (stretchability) upon the formation of this oriented film, and the shrink, creep, oxygen transmission rate and water vapor transmission rate of the resultant film, as well as the maximum overfill rate and ease of filling upon filling with sausage and wrinkling tendency after boiling and cooling as properties in practical use were separately evaluated. The results are shown in Table 1.

EXAMPLE 2

An oriented film was produced and evaluated in the same manner as in Example 1 except that nylon 610/MXD6 (molar ratio of the comonomers: 80/20; Tm: 173° C.) was used as the copolymer nylon in place of nylon 6/12/MXD6. The results are shown in Table 1.

COMPARATIVE EXAMPLES 1–3

Oriented film were produced and evaluated in the same manner as in Example 1 except that their corresponding resin compositions shown in Table 1 were separately used. The results are shown in Table 1.

TABLE 1

|  |  | Example | | Comp. Ex. | | |
|---|---|---|---|---|---|---|
|  |  | 1 | 2 | 1 | 2 | 3 |
| Compo- | Nylon 6 | 56 | 56 | 56 | — | 56 |
| sition | Amorphous nylon | 12 | 12 | 24 | 24 | 12 |

TABLE 1-continued

|  |  | Example | | Comp. Ex. | | |
|---|---|---|---|---|---|---|
|  |  | 1 | 2 | 1 | 2 | 3 |
| (wt. %) | Nylon 6/12/MXD6 | 12 | — | — | — | — |
|  | Nylon 610/MXD6 | — | 12 | — | — | — |
|  | Nylon 6/66 | — | — | — | 56 | — |
|  | MXD6 | — | — | — | — | 12 |
|  | PE | 10 | 10 | 10 | 10 | 10 |
|  | EAA | 10 | 10 | 10 | 10 | 10 |
| Film properties | Stretchability | ○ | ○ | X | ○ | Δ |
|  | Shrinkage (%) L direction | 14 | 13 | 10 | 11 | 9 |
|  | T direction | 12 | 12 | 9 | 10 | 7 |
|  | Creep (%) L direction | 16 | 17 | 16 | 21 | 15 |
|  | T direction | 10 | 10 | 3 | 8 | 9 |
|  | Oxygen transmission rate ($cm^3/m^2 \cdot day \cdot atm$) | 174 | 185 | 146 | 228 | 142 |
|  | water vapor transmission rate ($g/m^2 \cdot day$) | 43 | 45 | 39 | 54 | 36 |
|  | Overfill rate (%) | 15 | 16 | 10 | 23 | 10 |
|  | Ease of filling | ○ | ○ | Δ | X | Δ |
|  | Wrinkling tendency | ○ | ○ | X | ○ | X |

It is understood from the results shown in Table 1 that the oriented films according to the present invention have stable stretchability and various properties and further have excellent performance in practical use as casing films.

EXAMPLES 3–5

Oriented films were produced and evaluated in the same manner as in Example 1 except that the same resins as those used in Example 1 are used, but their corresponding resin compositions shown in Table 2 are separately used.

TABLE 2

|  |  | Example | | |
|---|---|---|---|---|
|  |  | 3 | 4 | 5 |
| Composition (wt. %) | Nylon 6 | 50 | 62 | 68 |
|  | Amorphous nylon | 10 | 10 | 8 |
|  | Nylon 6/12/MXD6 | 20 | 8 | 8 |
|  | PE | 10 | 10 | 8 |
|  | EAA | 10 | 10 | 8 |
| Film properties | Stretchability | ○ | ○ | ○ |
|  | Shrinkage (%) L direction | 14 | 14 | 13 |
|  | T direction | 13 | 13 | 11 |
|  | Creep (%) L direction | 17 | 15 | 12 |
|  | T direction | 8 | 8 | 7 |
|  | Oxygen transmission rate ($cm^3/m^2 \cdot day \cdot atm$) | 190 | 160 | 200 |
|  | water vapor transmission rate ($g/m^2 \cdot day$) | 45 | 42 | 49 |
|  | Overfill rate (%) | 16 | 15 | 15 |
|  | Ease of filling | ○ | ○ | ○ |
|  | Wrinkling tendency | ○ | ○ | ○ |

It is understood from the results shown in Table 2 that the oriented films according to the present invention are well balanced among properties such as stretchability, shrinkability and gas barrier properties and have excellent performance in practical use as casing films.

EXAMPLE 6

The oriented film obtained in Example 2 was used as a casing film as it is, and filled with 300 g of pork sausage at a fill rate of 10%, thereby producing 100 filled products. These products were boiled for 60 minutes in hot water of 80° C., and then immediately cooled in cold water of 5° C. After the packages were kept for a day at 5° C. in a refrigerator, their dimensions were measured. Dimensional scatters in length and perimeter are shown in Table 3. It is understood that the dimensional scatters of the packages according to the present invention are narrow.

COMPARATIVE EXAMPLE 4

Pork sausage was filled in the same manner as in Example 6 except that the tubular oriented film obtained in Comparative Example 1 was used as the casing film, and the resultant packages were evaluated in the same manner. The results are shown in Table 3. However, when this casing film was used and filled with the sausage at a fill rate of 10%, any package could not be stably obtained.

COMPARATIVE EXAMPLE 5

Pork sausage was filled in the same manner as in Example 6 except that the tubular oriented film obtained in Comparative Example 2 was used as the casing film, and the resultant packages were evaluated in the same manner. The results are shown in Table 3. The dimensional scatters of the resultant packages were wide in both length and perimeter.

TABLE 3

|  | Dimensional scatter of packaged sausage (%) | |
|---|---|---|
|  | Longitudinal direction | Transversal direction |
| Example 6 | 3.0 | 2.8 |
| Comp. Ex. 4 | — | — |
| Comp. Ex. 5 | 8.3 | 11.7 |

EXAMPLE 7

A tubular oriented film having a width of 250 mm was produced in the same manner as in Example 2 and then slit into flat films having a width of 90 mm. The flat film was used to conduct a bag-making experiment by means of an automatic filling and packaging machine (KAP500 Model, trade name, manufactured by Kureha Chemical Industry Co., Ltd.). Specifically, bag-making properties such as slip property at forming parts and high-frequency sealability are evaluated under conditions of a width between folds of 38 mm and a bag-making speed of 15 m/min. As a result, it was found that the film has stable and good suitability for automatic packaging.

EXAMPLE 8

VLDPE (EXCELLEN VL401, trade name, product of Sumitomo Chemical Co., Ltd.), an adhesive resin (SF730, trade name, product of Mitsui petrochemical Industries, Ltd.), nylon 6/66 (AMILAN CM6241M, trade name, product of Toray Industries, Inc.) and nylon 6/61 (SNIAMID F36T, trade name, product of Caffaro Co., LTD., Tm: 220° C.) were co-extruded into a tube having the following layer structure by means of 4 extruders, thereby obtaining a cold parison (non-oriented multi-layer tube). The cold parison was then heated again and stretched each 2.5 times in machine and transversal directions by an inflation method. The thus-obtained tubular film was cut in the take-up direction of the film, thereby obtaining a film having a width between folds of 450 mm. This film was seamed at its center by an overlap sealing to produce a casing film. Processed meat was then filled into the casing film, and the package was heated at 90° C. for 1 minutes to shrink the film. As a result, it was found that the film beautifully fits on the processed meat, and its edges are soft to the touch and do not damage fingertips.

The layer structure of the film was as follows: outer layer (VLDPE; 10 μm)/adhesive layer (1 μm)/intermediate layer (nylon 6/66; 12 μm)/intermediate layer (nylon 6/6I; 6 μm)/adhesive layer (1 μm)/inner layer (VLDPE; 18 μm).

This multi-layer film had good stretchability (rank: ○), an oxygen transmission rate of 250 cm³/m²·day·atm and hot-water shrinks of 27% and 26% in longitudinal and transversal directions, respectively.

EXAMPLE 9

Co-PET (BELL PET IFG-8L, trade name, product of Kanebo, Ltd., melting point: 226°C.), an adhesive resin (SF730, trade name, product of Mitsui petrochemical Industries, Ltd.), a mixture of 60 wt. % of nylon 6 (AMILAN CM6001, trade name, product of Toray Industries, Inc.) and 40 wt. % of nylon 6/6I (SNIAMID F36T, trade name, product of Caffaro Co., LTD., Tm: 220° C.), EVOH (EP-S105A, trade name, product of Kuraray Co., Ltd.), and VLDPE (EXCELLEN VL401, trade name, product of Sumitomo Chemical Co., Ltd.) were co-extruded into a tube having the following layer structure by means of 5 extruders, thereby obtaining a cold parison (non-oriented multi-layer tube). The cold parison was then heated again and stretched each about 2.9–3.0 times in machine and transversal directions by an inflation method. The thus-obtained tubular film was cut in the take-up direction of the film, thereby obtaining a film having a width between folds of 450 mm. This film was filled with processed meat by a pillow packaging machine, sealed and cut into predetermined lengths. Thereafter, the resultant packages were heated at 90° C. for 1 minute to shrink the film. As a result, it was found that the film has smooth suitability for the automatic packaging machine, beautifully fits on the processed meat after boiling the package, and has superior surface gloss.

The layer structure of the film was as follows: outer layer (co-PET; 2 μm)/adhesive layer (1 μm)/intermediate layer (mixture of 60 wt. % of nylon 6 and 40 wt. % of nylon 6/6I; 6 μm)/intermediate layer (EVOH; 5 μm)/adhesive layer (1 μm)/inner layer (VLDPE; 18 μm).

This multi-layer film had good stretchability (rank: ○), an oxygen transmission rate of 90 cm³/m²·day·atm and hot-water shrinks of 34% and 32% in longitudinal and transversal directions, respectively.

EXAMPLE 10

A mixture of 90 wt. % of nylon 6 (AMILAN CM1021XF, trade name, product of Toray Industries, Inc.) and 10 wt. % of nylon 610/MXD6 (ratio of comonomer: 80/20 wt. %, Tm: 173° C.), an adhesive resin (F3100K, trade name, product of Mitsubishi Kagaku Co., Ltd.), VLDPE (EXCELLEN VL401, trade name, product of Sumitomo Chemical Co., Ltd.), and a mixture of 98 wt. % of nylon 6 (AMILAN CM1021XF, trade name, product of Toray Industries, Inc.) and 2 wt. % of a lubricant (EEA/CaCO₃=94/6 by weight) were co-extruded into a tube having the following layer structure by means of 4 extruders, thereby obtaining a cold parison (non-oriented multi-layer tube). The cold parison was then heated again and stretched 2.5 times and 3.1 times, respectively, in machine and transversal directions by an inflation method, and relaxed at a temperature of 80° C. and a relaxation rate of 5–7%, thereby obtaining a tubular film having a thickness of about 50 μm. The tubular film was used as a casing film to conduct a pork sausage-filling experiment in the same manner as in Example 6. The resultant packaged products of pork sausage scarcely vary in dimensions and were beautifully finished.

The layer structure of the film was as follows: outer layer (mixture of 90 wt. % of nylon 6 and 10 wt. % of nylon 610/MXD6; 20 μm)/adhesive layer (2 μm)/intermediate layer (VLDPE; 20 μm)/adhesive layer (2 μm)/inner layer (mixture of 98 wt. % of nylon 6 and 2 wt. % of the lubricant; 5 μm).

This multi-layer film had good stretchability (rank: ○) which has been unable to be achieved by the conventional structure making use of nylon 6, an oxygen transmission rate of 280 cm³/m²·day·atm and hot-water shrinks of 15% and 10% in longitudinal and transversal directions, respectively.

EXAMPLE 11

A non-oriented sheet having the following 7-layer structure was produced by an upward blown-film extrusion process (apparatus: manufactured by BARMAG) using 5 extruders.

(1) Outer layer: MDPE (grade: LUPOLEN 3020F, product of BASF);

(2) Adhesive layer: 15 wt. % of adhesive resin (grade: OREVAC, product of ATO-CHEM) and 85 wt. % of LDPE (grade: ATTANE, product of DOW CHEMICAL);

(3) Intermediate layer:
① Nylon 6/66 (grade: ULTRAMID C35F, product Of BAYER),
② Mixture of 80 wt. % of nylon MXD6 (grade: MXD6 6007K, product of Mitsubishi Gas Chemical Company, Inc.) and 20 wt. % of nylon 6/12/MXD6 (that described above),
③ Nylon 6/66 (that described above);

(4) Adhesive layer: 15 wt. % of adhesive resin (grade: OREVAC, product of ATO-CHEM) and 85 wt. % of LDPE (grade: ATTANE, product of DOW CHEMICAL);

(5) Inner layer: MDPE (that described above).

The multi-layer sheet thus obtained had a thickness of 140 μm in total and was composed of the outer layer (20 μm)/adhesive layer (8 μm)/intermediate layers (15/15/15 μm)/adhesive layer (8 μm)/inner layer (59 μm).

The multi-layer sheet of this laminated structure had stable suitability for blown-film extrusion and was able to be produced at a production line speed at least 1.3 times as fast as that of the multi-layer sheet obtained in Comparative Example 6 which will be described subsequently. The multi-layer sheet was heated at 100° C. for 2 seconds by a deep-drawing machine and then deep drawn under a gauge pressure of 0.3 MPa. As a result, a container having a diameter of 100 mm and a depth of 30 mm could be obtained.

EXAMPLE 12

A multi-layer sheet was produced in the same manner as in Example 11 except that the intermediate layers were changed to ① a mixture of 95 wt.* of nylon 6 (grade: DURETHANE B35FKA, product of BASF) and 5 wt. % of nylon 6/12/MXD6 (that described above), ② a mixture of 85 wt. % of nylon MXD6 (that described above) and 15 wt. % of nylon 6/12/MXD6 (that described above), and ③ a mixture of 95 wt. % of nylon 6 (that described above) and 5 wt. % of nylon 6/12/MXD6 (that described above).

The multi-layer sheet of this laminated structure had stable suitability for blown-film extrusion and was able to be produced at a production line speed at least 1.3 times as fast as that of the multi-layer sheet obtained in Comparative Example 6 which will be described subsequently. The multi-layer sheet was heated at 100° C. for 2 seconds by a deep-drawing machine and then deep drawn under a gauge pressure of 0.3 MPa. As a result, a container having a diameter of 100 mm and a depth of 30 mm could be obtained.

EXAMPLE 13

A multi-layer sheet was produced in the same manner as in Example 11 except that the intermediate layers were changed to ① a mixture of 90 wt. % of nylon 6 (that described above) and 10 wt. % of nylon 6/12/MXD6 (that described above), ② nylon MXD6 (that described above), and ③ a mixture of 90 wt. % of nylon 6 (that described above) and 10 wt. % of nylon 6/12/MXD6 (that described above).

The multi-layer sheet of this laminated structure had stable suitability for blown-film extrusion. The multi-layer sheet was heated at 100° C. for 2 seconds by a deep-drawing machine and then deep drawn under a gauge pressure of 0.3 MPa. As a result, a container having a diameter of 100 mm and a depth of 30 mm could be obtained.

COMPARATIVE EXAMPLE 6

A multi-layer sheet was produced in the same manner as in Example 11 except that the intermediate layers were changed to ① nylon 6 (that described above), ② nylon MXD6 (that described above), and ③ nylon 6 (that described above). The multi-layer sheet was somewhat difficult to be deep drawn.

EXAMPLE 14

A multi-layer sheet was produced in the same manner as in Example 11 except that the intermediate layers were changed to ① a mixture of 90 wt. % of nylon 6 (that described above) and 10 wt. % of nylon 6/12/MXD6 (that described above), ② EVOH (that described above), and ③ a mixture of 90 wt. % of nylon 6 (that described above) and 10 wt. % of nylon 6/12/MXD6 (that described above), and the thickness and structure of the sheet were changed as follows.

The multi-layer sheet thus obtained had a thickness of 140 μm in total and was composed of the outer layer (20 μm)/adhesive layer (8 μm)/intermediate layers (18/10/18 μm)/adhesive layer (8 μm)/inner layer (58 μm).

The multi-layer sheet of this structure had stable suitability for blown-film extrusion and was able to be produced at a production line speed at least 1.4 times as fast as that of the multi-layer sheet obtained in Comparative Example 7 which will be described subsequently. The thus-obtained tubular film was cut in the take-up direction of the film, thereby obtaining a film having a width between folds of 400 mm. This film was filled with processed meat by a pillow packaging machine, sealed and cut into predetermined lengths. As a result, it was found that the film has smooth suitability for the automatic packaging machine. The multi-layer sheet was soft to the touch, which has been achieved by the conventional films or sheets of this type, and was well balanced between the suitability for packaging machines and softness.

COMPARATIVE EXAMPLE 7

A multi-layer sheet was produced in the same manner as in Example 14 except that the intermediate layers were changed to ① nylon 6 (that described above), ② EVOH (that described above) and ③ nylon 6 (that described above). (See Example 14 as to the evaluation of this multi-layer sheet)

What is claimed is:

1. A single-layer or multi-layer packaging film or sheet having at least one layer formed of a polyamide resin composition, wherein the layer formed of the polyamide resin composition is a layer (A) formed of a polyamide resin composition comprising:
   at least 5 wt. % of a copolymer nylon (c) copolymerized from an aliphatic nylon (co)polymer component (1) and an aromatic nylon (co)polymer component (2); and
   at most 95 wt. % of a nylon (co)polymer (i) other than the copolymer nylon (c).

2. A single-layer or multi-layer blow molded container having at least one layer formed of a polyamide resin composition, wherein the layer formed of the polyamide resin composition is a layer (A) formed of a polyamide resin composition comprising:
   at least 5 wt. % of a copolymer nylon (c) compolymerized from an aliphatic nylon (co)polymer component (1) and an aromatic nylon (co)polymer component (2), and at most 95 wt. % of another nylon (co)polymer (i) other than the copolymer nylon (c), or formed of the copolymer nylon (c) alone.

3. The packaging film or sheet according to claim 1, wherein the aromatic nylon (co)polymer component (2) in the copolymer nylon (c) has an aromatic diamine unit.

4. The packaging film or sheet according to claim 1, wherein the aromatic nylon (co)polymer component (2) in the copolymer nylon (c) has an aromatic dicarboxylic acid unit.

5. The packaging film or sheet according to claim 1, wherein the copolymer nylon (c) comprises at most 40 wt. % of the aromatic nylon (co)polymer component (2).

6. The packaging film or sheet according to claim 3, wherein the copolymer nylon (c) is a copolymer nylon comprising ① 60–96 wt. % of the aliphatic nylon (co)polymer component and ② 4–40 wt. % of an aromatic nylon component containing a xylylenediamine unit as the aromatic nylon (co)polymer component.

7. The packaging film or sheet according to claim 3, wherein the copolymer nylon (c) is a copolymer nylon comprising ① 45–92 wt. % of at least one aliphatic nylon component selected from the group consisting of the components of nylon 6, nylon 66 and nylon 610 and ② 4–25 wt. % of another aliphatic nylon component than the component ① as the aliphatic nylon copolymer component, and ④ 4–40 wt. % of an aromatic nylon component containing a xylylenediamine unit as the aromatic nylon (co)polymer component.

8. The packaging film or sheet according to claim 4, wherein the copolymer nylon (c) is a copolymer nylon comprising ① 60–96 wt. % of the aliphatic nylon (co)polymer component and ② 4–40 wt. % of a polycondensate component of hexamethylenediamine with at least one aromatic dicarboxylic acid selected from the group consisting of isophthalic acid and terephthalic acid as the aromatic nylon (co)polymer component.

9. The packaging film or sheet according to claim 1, wherein said nylon (co)polymer (i) is selected from the group consisting of nylon 6 (a) and amorphous nylon (b).

10. The packaging film or sheet according to claim 9, wherein the polyamide resin composition layer (A) is a layer formed of a polyamide resin composition comprising 40–70 wt. % of nylon 6 (a), 5–20 wt. % of an amorphous nylon (b), 5–30 wt. % of the copolymer nylon (c) and 10–30 wt. % of a polyolefin resin (d).

11. The packaging film or sheet according to claim 9, wherein the polyamide resin composition layer (A) is a layer formed of a polyamide resin composition comprising 50–95 wt. % of nylon 6 (a) and 5–50 wt. % of the copolymer nylon (c).

12. The packaging film or sheet according to claim 1, wherein the polyamide resin composition layer (A) is a layer formed of a polyamide resin composition comprising 50–95 wt. % of nylon MXD6 (e) as said nylon (co)polymer (i) and 5–50 wt. % of the copolymer nylon (c).

13. The packaging film or sheet according to claim 1, comprising a single-layer oriented film or sheet composed of the polyamide resin composition layer (A).

14. The packaging film or sheet according to claim 1, comprising a multi-layer oriented film or sheet comprising at least one polyamide resin composition layer (A).

15. The packaging film or sheet according to claim 14, wherein at least one polyamide resin composition layer (A) is provided as an intermediate layer.

16. The packaging film or sheet according to claim 15, wherein at least one polyamide resin composition layer (A) is provided as an intermediate layer, and polyolefin resin layers are provided as the outermost and innermost layers through adhesive resin layers.

17. The packaging film or sheet according to claim 15, wherein at least one polyamide resin composition layer (A) is provided as an intermediate layer, and a polyethylene terephthalate resin layer and a polyolefin resin layer are provided as one surface layer and the other surface layer, respectively, through adhesive resin layers.

18. The packaging film or sheet according to claim 14, wherein the polyamide resin composition layer (A) is provided as at least one surface layer.

19. The packaging film or sheet according to claim 18, wherein a polyolefin resin layer is provided as an intermediate layer.

20. The packaging film or sheet according to claim 18, wherein the polyamide resin composition layer (A) is provided as at least one surface layer, and a polyamide layer is provided as the other surface layer.

21. The packaging film or sheet according to claim 14, having a layer structure comprising the at least one polyamide resin composition layer (A) provided in adjacency with at least one of at least one polyamide resin layer and at least one gas barrier resin layer.

22. The packaging film or sheet according to claim 1, comprising a non-oriented film or sheet comprising at least one polyamide resin composition layer (A).

23. The packaging film or sheet according to claim 2, wherein at least one polyamide resin composition layer (A) is provided as an intermediate layer.

24. The packaging film or sheet according to claim 23, wherein at least one polyamide resin composition layer (A) is provided as an intermediate layer, and polyolefin resin layers are provided as the outermost and innermost layers through adhesive resin layers.

25. The packaging film or sheet according to claim 23, wherein at least one polyamide resin composition layer (A) is provided as an intermediate layer, and a polyethylene terephthalate resin layer and a polyolefin resin layer are provided as one surface layer and the other surface layer, respectively, through adhesive resin layers.

26. The packaging film or sheet according to claim 22, wherein the polyamide resin composition layer (A) is provided as at least one surface layer.

27. The packaging film or sheet according to claim 26, wherein a polyolefin resin layer is provided as an intermediate layer.

28. The packaging film or sheet according to claim 26, wherein the polyamide resin composition layer (A) is provided as at least one surface layer, and a polyamide layer is provided as the other surface layer.

29. The packaging film or sheet according to claim 22, having a layer structure comprising the at least one polyamide resin composition layer (A) provided in adjacency with at least one of at least one polyamide resin layer and at least one gas barrier resin layer.

30. A multi-layer packaging film or sheet having a layer structure that at least two layers of
    a layer formed of a copolymer nylon (c) copolymerized from an aliphatic nylon (co)polymer component (1) and an aromatic nylon (co)polymer component (2), and
    a layer formed of a polyamide resin other than the copolymer nylon (c) are provided in adjacency with each other.

31. A multi-layer packaging film or sheet having a layer structure composed of at least two layers of
    a layer formed of a polyamide resin composition comprising a copolymer nylon (c) copolymerized from an aliphatic nylon (co)polymer component (1) and an aromatic nylon (co)polymer component (2) having an aromatic diamine unit, and
    at least one layer of a layer formed of a polyamide resin composition other than the above composition, and a gas barrier resin layer.

32. The packaging film or sheet according to claim 1, which has an oxygen transmission rate of 300 cm$^3$/m$^2$·day·atm or smaller.

33. The packaging film or sheet according to claim 1, which is an oriented film and has a hot-water shrink of at least 5%.

34. The packaging film or sheet according to claim 1, which is a casing film.

35. The packaging film or sheet according to claim 22, which is a film or sheet suitable for deep-draw packaging.

36. The packaging film according to claim 14, which is a film suitable for pillow packaging.

37. The packaging film or sheet according to claim 22, which is a film or sheet suitable for pillow packaging.

* * * * *

UNITED STATES PATENT AND TRADEMARK OFFICE
CERTIFICATE OF CORRECTION

PATENT NO.    : 6,416,832 B1
DATED         : July 9, 2002
INVENTOR(S)   : Tsutomu Uehara et al.

It is certified that error appears in the above-identified patent and that said Letters Patent is hereby corrected as shown below:

Column 18,
Line 47, change "④" to -- ③ --.

Column 19,
Line 49, change "2" to -- 22 --.

Signed and Sealed this

Twenty-second Day of October, 2002

Attest:

Attesting Officer

JAMES E. ROGAN
Director of the United States Patent and Trademark Office